United States Patent
Huang-Fu et al.

(10) Patent No.: US 11,197,216 B2
(45) Date of Patent: Dec. 7, 2021

(54) HANDLING OF COLLISION BETWEEN SR PROCEDURE AND PDU SESSION ESTABLISHMENT PROCEDURE FOR PDU SESSION HANDOVER

(71) Applicant: MEDIATEK INC., Hsin-Chu (TW)

(72) Inventors: Chien-Chun Huang-Fu, Hsin-Chu (TW); Chi-Hsien Chen, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 0 days.

(21) Appl. No.: 16/535,691

(22) Filed: Aug. 8, 2019

(65) Prior Publication Data

US 2020/0053603 A1 Feb. 13, 2020

Related U.S. Application Data

(60) Provisional application No. 62/717,352, filed on Aug. 10, 2018.

(51) Int. Cl.
*H04W 36/14* (2009.01)
*H04W 36/36* (2009.01)
(Continued)

(52) U.S. Cl.
CPC .......... *H04W 36/14* (2013.01); *H04W 8/183* (2013.01); *H04W 76/11* (2018.02); *H04W 76/20* (2018.02);
(Continued)

(58) Field of Classification Search
CPC ..... H04W 40/02; H04W 48/12; H04W 48/18; H04W 76/11–19; H04W 88/02–06;
(Continued)

(56) References Cited

U.S. PATENT DOCUMENTS 8,625,540 B2 * 1/2014 Uemura ................ H04W 36/36 370/332
2004/0109466 A1 6/2004 Van Ackere et al. ......... 370/419
(Continued)

FOREIGN PATENT DOCUMENTS

CN 101895966 A 11/2010
CN 102724736 A 10/2012
(Continued)

OTHER PUBLICATIONS

International Search Report and Written Opinion of International Search Authority for PCT/CN2019/100199 dated Oct. 30, 2019 (8 pages).

(Continued)

*Primary Examiner* — San Htun
(74) *Attorney, Agent, or Firm* — Imperium Patent Works; Zheng Jin (57) ABSTRACT

A method for handling PDU session handover procedure collision in a next generation NG/5G system is proposed. Both network-triggered and UE-triggered PDU session handover procedures can occur at the same time. If Paging or Notification for PDU session handover comes before UE initiated MO PDU session establishment procedure for PDU session handover, then UE should avoid sending the PDU session establishment request for PDU session handover but only send the service request as a response to paging. On the other hand, if Paging or Notification for PDU session handover comes after UE initiated MO PDU session establishment procedure for PDU session handover, then UE should avoid sending the service request for PDU session handover but proceed with the PDU session establishment procedure as a response to paging.

14 Claims, 4 Drawing Sheets

(51) Int. Cl.
| | | |
|---|---|---|
| *H04W 76/11* | (2018.01) | |
| *H04W 88/06* | (2009.01) | |
| *H04W 76/20* | (2018.01) | |
| *H04W 8/18* | (2009.01) | |
| *H04W 40/02* | (2009.01) | |
| *H04W 48/12* | (2009.01) | |
| *H04L 12/813* | (2013.01) | |
| *H04L 29/06* | (2006.01) | |
| *H04L 12/725* | (2013.01) | |
| *H04W 28/02* | (2009.01) | |
| *H04W 28/12* | (2009.01) | |
| *H04W 36/00* | (2009.01) | |
| *H04W 68/02* | (2009.01) | |
| *H04W 76/27* | (2018.01) | |
| *H04L 29/08* | (2006.01) | |
| *H04W 28/04* | (2009.01) | |
| *H04W 36/08* | (2009.01) | |
| *H04W 48/18* | (2009.01) | |
| *H04W 84/04* | (2009.01) | |

(52) U.S. Cl.
CPC ............ *H04L 45/306* (2013.01); *H04L 47/20* (2013.01); *H04L 65/1003* (2013.01); *H04L 67/141* (2013.01); *H04L 67/146* (2013.01); *H04L 67/148* (2013.01); *H04W 28/0215* (2013.01); *H04W 28/0252* (2013.01); *H04W 28/0268* (2013.01); *H04W 28/04* (2013.01); *H04W 28/12* (2013.01); *H04W 36/0022* (2013.01); *H04W 36/08* (2013.01); *H04W 40/02* (2013.01); *H04W 48/12* (2013.01); *H04W 48/18* (2013.01); *H04W 68/02* (2013.01); *H04W 76/27* (2018.02); *H04W 84/042* (2013.01)

(58) Field of Classification Search
CPC ... H04L 67/141; H04L 67/146; H04L 67/148; H04L 47/20; H04L 65/1003; H04L 45/306
See application file for complete search history.

(56) References Cited

U.S. PATENT DOCUMENTS

| | | | |
|---|---|---|---|
| 2008/0192925 A1* | 8/2008 | Sachs | H04L 12/5692 380/29 |
| 2010/0093340 A1 | 4/2010 | Buracchini | 455/426.1 |
| 2010/0234016 A1* | 9/2010 | Palanki | H04W 48/08 455/424 |
| 2011/0096660 A1* | 4/2011 | Ikeda | H04W 36/36 370/225 |
| 2012/0082132 A1* | 4/2012 | Andreasen | H04L 45/22 370/331 |
| 2014/0112150 A1 | 4/2014 | Ko et al. | 370/236 |
| 2014/0315542 A1* | 10/2014 | Shatil | H04W 36/00837 455/432.1 |
| 2015/0296431 A1 | 10/2015 | Li et al. | 370/331 |
| 2015/0351021 A1 | 12/2015 | Zhang et al. | H04W 48/18 |
| 2016/0157170 A1 | 6/2016 | Daoud Triki et al. | H04W 48/16 |
| 2017/0135005 A1 | 5/2017 | Basu Mallick et al. | 455/434 |
| 2017/0339609 A1* | 11/2017 | Youn | H04W 76/11 |
| 2018/0048537 A1 | 2/2018 | Gaikwad et al. | |
| 2018/0049218 A1 | 2/2018 | Hapsari et al. | |
| 2018/0070276 A1 | 3/2018 | Wu | |
| 2018/0220290 A1 | 8/2018 | Sivavakeesar | |
| 2018/0220338 A1 | 8/2018 | Tabe et al. | |
| 2018/0220344 A1 | 8/2018 | Shaheen | |
| 2018/0279214 A1 | 9/2018 | Chandramouli et al. | |
| 2018/0288654 A1 | 10/2018 | Shih et al. | |
| 2018/0324577 A1 | 11/2018 | Faccin et al. | |
| 2019/0029057 A1 | 1/2019 | Pan et al. | |
| 2019/0053308 A1 | 2/2019 | Castellanos Zamora et al. | |
| 2019/0166647 A1 | 5/2019 | Velev et al. | |
| 2019/0174573 A1 | 6/2019 | Velev et al. | |
| 2019/0223060 A1 | 7/2019 | Zhou et al. | |
| 2019/0223091 A1 | 7/2019 | Huang-Fu et al. | H04L 5/00 |
| 2019/0253870 A1 | 8/2019 | Ronneke et al. | |
| 2019/0289506 A1* | 9/2019 | Park | H04W 8/08 |
| 2019/0313310 A1 | 10/2019 | Won et al. | |
| 2020/0053562 A1 | 2/2020 | Kim et al. | |
| 2020/0053642 A1 | 2/2020 | Huang Fu et al. | |
| 2020/0154389 A1 | 5/2020 | Karampatsis et al. | |
| 2020/0178196 A1 | 6/2020 | Wang et al. | |

FOREIGN PATENT DOCUMENTS

| | | |
|---|---|---|
| CN | 103517325 A | 1/2014 |
| CN | 108024299 A | 11/2016 |
| CN | 107592331 A | 1/2018 |
| CN | 111512668 A | 1/2018 |
| CN | 107690161 A | 2/2018 |
| CN | 107925862 A | 4/2018 |
| CN | 108307449 A | 7/2018 |
| EP | 3528543 A1 | 11/2016 |
| EP | 3557905 A1 | 10/2019 |
| WO | WO2014114525 A1 | 7/2014 |
| WO | WO2018034337 A1 | 2/2018 |
| WO | WO2018065060 A1 | 4/2018 |
| WO | WO2018070436 A1 | 4/2018 |
| WO | WO2018111029 A1 | 6/2018 |

OTHER PUBLICATIONS

3GPP TS 23.502 V15.2.0 (Jun. 2018), 3rd Generation Partnership Project; Technical Specification Group Services and System Aspects; Procedures for the 5G System; Stage 2 (Release 15) *pp. 55-63, 125-128*.

C1-173057 3GPP TSG-CT WG1 Meeting #105, Huawei et al., "5GSM message for PDU session anchor relocation for SSC mode 2 and SSC mode 3", Krakow, Poland, Aug. 21-25, 2017 (5 pages).

International Search Report and Written Opinion of International Search Authority for PCT/CN2019/100218 dated Nov. 4, 2019 (9 pages).

International Search Report and Written Opinion of International Search Authority for PCT/CN2019/099889 dated Oct. 31, 2019 (9 pages).

3GPP TS 24.501 v15.0.0 (Jun. 2018), 3rd Generation Partnership Project; Technical Specification Group Core Network and Terminals; Non-Access-Stratum (NAS) protocol for 5G System (5GS); Stage 3 (Release 15) *clause 6.1 to 6.2.3*, Best Available Date : Jun. 2008.

International Search Report and Written Opinion of International Search Authority for PCT/CN2019/099719 dated Oct. 31, 2019 (9 pages).

C1-184425 3GPP TSG-CT WG1 Meeting #111bis, MediaTek Inc., "Exception handling in QoS operation", Sophia-Antipolis, France, Jul. 9-13, 2018 (8 pages).

C1-184614 3GPP TSG CT WG1 Meeting #111bis, MediaTek Inc., "Exception handling in QoS operation", Sophia-Antipolis, France, Jul. 9-13, 2018 (7 pages).

Taiwan IPO, office action for the TW patent application 108127878 (no English translation is available) dated Apr. 17, 2020 (7 pages).

C1-184425 3GPP TSG-CT WG1 Meeting #111bis, MediaTek Inc., "Exception handling in QoS operation", Sophia-Antipolis, France, Jul. 9-13, 2018 (8 pages). *section 6*.

Taiwan IPO, office action for the TW patent application 108128520 (no English translation is available) dated Apr. 24, 2020 (6 pages).

3GPP TS 23.503 V1.0.0 (Dec. 2017), 3rd Generation Partnership Project; Technical Specification Group Services and System Aspects; Policy and Charging Control Framework for the 5G System; Stage 2 (Release 15) *see 4.2.2, 6.1.2.2, 6.2.2*.

International Search Report and Written Opinion of International Search Authority for PCT/CN2019/099905 dated Nov. 19, 2019 (10 pages).

(56) References Cited

OTHER PUBLICATIONS

C1-173817 3GPP TSG-CT WG1 Meeting #106, Ericsson et al, "5G QoS-errors in QoS rules IE", Kochi, India, Oct. 23-27, 2017 (19 pages) *sections 9, 12*.
R3-171125 3GPP TSG-RAN WG2 #95bis, Nokia et al., "PDU Session Modification Procedure", Spokane, USA, Apr. 3-7, 2017 (3 pages).
International Search Report and Written Opinion of International Search Authority for PCT/CN2019/100200 dated Nov. 14, 2019 (9 pages).
3GPP TS 23.503 V1.0.0 (Dec. 2012), 3rd Generation Partnership Project; Technical Specification Group Services and System Aspects; Policy and Charging Control Framework for the 5G System; Stage 2 (Release 15) *see 4.2.2 and 6.1.2*, Best Available Date: Dec. 2017.
Taiwan IPO, office action for the TW patent application 108128518 (no English translation is available) dated Jul. 10, 2020 (10 pages).
3GPP TR 24.890 V15.1.0 (Mar. 2018), 3rd Generation Partnership Project; Technical Specification Group Core Network and Terminals; 5G System—phase 1; CT WG1 Aspects (Release 15) *sections 6.1, 8.5.1.2.7, 8.5.1.3.2.1.1.3, 8.5.3.1.1, 8.5.3.1.2, 8.5.3.2.2.1, 8.5.3.2.2.3, 9.3.4, 9.5.3.1, 9.5.3.2, 10.3.2*.
USPTO, office action U.S. Appl. No. 16/535,580 dated Aug. 4, 2020 (18 pages).
Taiwan IPO, office action for the TW patent application 108128522 (no English translation is available) dated Nov. 19, 2020 (27 pages).
3GPP TR 23.727 V0.2.0 (Jun. 2018), 3rd Generation Partnership Project; Technical Specification Group Services and System Aspects; Study on Application Awareness Interworking between LTE and NR (Release 16) *sections 2, 4, 5.1.1, 6.1.2, 6.3.1.1, 6.4.1*.
3GPP TS 23.122 V15.4.0 (Jun. 2018), 3rd Generation Partnership Project; Technical Specification Group Core Network and Terminals; Non-access-Stratum (NAS) function related to Mobile Station (MS) in idle mode (Release 15) *1.2, 2, 3.1, 4.4.3, 4.4.3.1, 4.4.3.1.1, 4.4.3.1.2, 4.4.3.3.1, 4.4.4*.
USPTO, office action for related U.S. Appl. No. 16/535,580 dated Dec. 22, 2020 (23 pages).
3GPP TR 24.890 V15.1.0 (Mar. 2018), 3rd Generation Partnership Project; Technical Specification Group Core Network and Terminals; 5G System—phase 1; CT WG1 Aspects (Release 15).
USPTO, the notice of allowance for related U.S. Appl. No. 16/530,152 dated Dec. 3, 2020 (13 pages).
USPTO, office action for related U.S. Appl. No. 16/535,730 dated Oct. 6, 2020 (14 pages).
U.S. Appl. No. 16/535,730 USPTO OA reference, 3GPP TSG-CT WG1 Meeting #109 C1-18daaa, Nokia et al., "Route selection descriptors in a URSP rule", Montreal, Canada, Feb. 26-Mar. 2, 2018 (3 pages).
Chinese Patent Office, opinion for patent application 201980002851.0 (no English translation is available) dated May 31, 2021 (8 pages).

* cited by examiner

HANDLING OF COLLISION BETWEEN SR PROCEDURE AND PDU SESSION ESTABLISHMENT PROCEDURE FOR PDU SESSION HANDOVER

CROSS REFERENCE TO RELATED APPLICATIONS

This application claims priority under 35 U.S.C. § 119 from U.S. Provisional Application No. 62/717,352, entitled "Performance Enhancement in 5G System", filed on Aug. 10, 2018, the subject matter of which is incorporated herein by reference.

TECHNICAL FIELD

The disclosed embodiments relate generally to wireless communication, and, more particularly, to method of handling collision between different procedures for PDU session handover in next generation mobile communication systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. With the optimization of the network design, many improvements have developed over the evolution of various standards. The Next Generation Mobile Network (NGMN) board, has decided to focus the future NGMN activities on defining the end-to-end requirements for 5G new radio (NR) systems.

In 5G/NR, a Protocol Data Unit (PDU) session defines the association between the UE and the data network that provides a PDU connectivity service. The PDU session establishment is a parallel procedure of PDN connection (bearer) procedure in 4G/LTE. Each PDU session is identified by a PDU session ID (PSI), and may include multiple QoS flows and QoS rules. Each PDU session can be established via a 5G Access Network (e.g., 3GPP radio access network (RAN), or via a non-3GPP RAN). Due to new radio conditions, load balancing, or due to specific service, different handover procedures are used to handover a UE from a source 5G access network node to a target 5G access network. The handover procedures to hand over the PDU session from non-3GPP access to 3GPP access can be triggered by the network using a service request (SR) procedure, or triggered by the UE via a Mobile-originated (MO) PDU session establishment procedure. However, it is not defined for the UE how to handle the collision between the SR procedure and the MO PDU session establishment procedure to hand over the same PDU session from non-3GPP access to 3GPP access.

A solution is sought.

SUMMARY

A method for handling PDU session handover procedure collision in a next generation NG/5G system is proposed. Both network-triggered and UE-triggered PDU session handover procedures can occur at the same time. If Paging or Notification for PDU session handover comes before UE initiated MO PDU session establishment procedure for PDU session handover, then UE should avoid sending the PDU session establishment request for PDU session handover but only send the service request as a response to paging. On the other hand, if Paging or Notification for PDU session handover comes after UE initiated MO PDU session establishment procedure for PDU session handover, then UE should avoid sending the service request for PDU session handover but proceed with the PDU session establishment procedure as a response to paging.

In one embodiment, a UE establishes a protocol data unit (PDU) session in mobile communication network. The PDU session is established and connected over a non-3GPP access. The UE receives a paging or notification message from the network for trying to perform a first PDU session handover procedure to hand over the PDU session to a 3GPP access. The UE determines that a second PDU session handover procedure is needed by the UE initiating a PDU session establishment procedure to hand over the same PDU session to the 3GPP access. The UE detects a collision between the first and the second PDU session handover procedures to hand over the same PDU session and decides whether to perform the first or the second PDU session handover procedure.

In one embodiment, the paging or notification message is received before the UE initiates the PDU session establishment procedure. The UE continues with the first PDU session handover procedure by sending a service request in response to the paging or the notification message to complete the PDU session handover. The UE stops the second PDU session handover procedure. In another embodiment, the paging or notification message is received after the UE initiates the PDU session establishment procedure. The UE continues with the second PDU session handover procedure by sending a PDU session establishment request message to the network over the 3GPP access. The UE stops the first PDU session handover procedure. Alternatively, UE shall abort the PDU session establishment procedure and send service request for PDU session handover (as a response to paging). A 5G session management (5GSM) layer or 5G mobility management (5GMM) layer of the UE decides whether to perform either the first PDU session handover or the second PDU session handover procedure.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
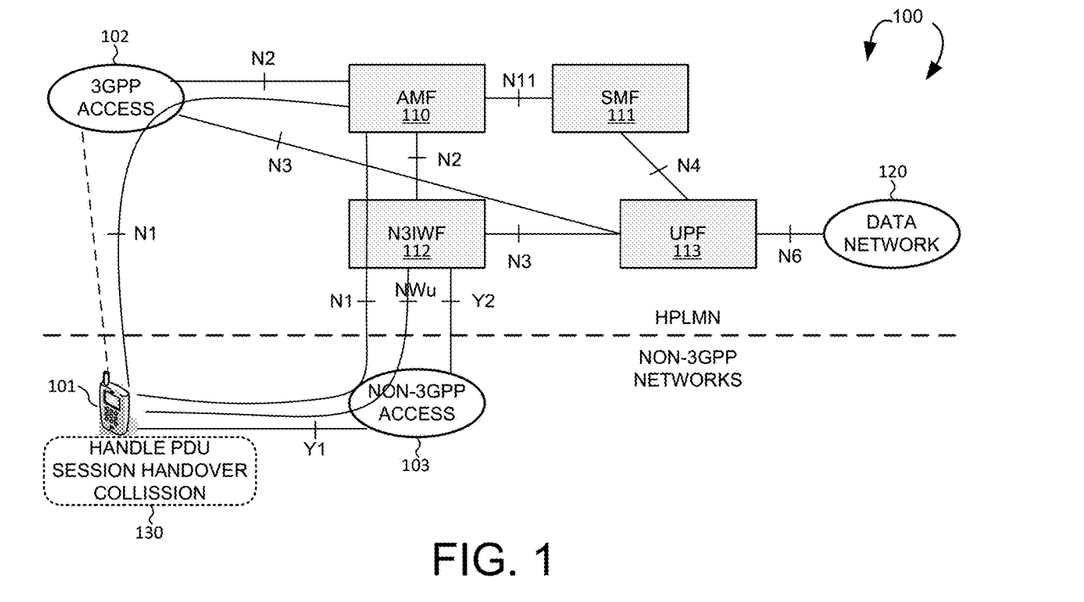
FIG. 1 illustrates an exemplary next generation system with multiple radio access networks and core networks and a user equipment (UE) performing PDU session handover from non-3GPP access to 3GPP access in accordance with one novel aspect.

FIG. 1 illustrates an exemplary next generation system 100 with multiple radio access networks and core networks and a user equipment (UE) 100 performing PDU session handover from non-3GPP access to 3GPP access in accordance with one novel aspect. Next generation 5G New Radio (NR) system 100 comprises UE 101, 3GPP radio access network RAN 102, non-3GPP radio access network RAN 103, AMF 110, SMF 111, N3IWF 112, UPF 113, and data network 120. An Access and Mobility Management Function (AMF) communicates with the BS, serving GW and PDN GW for access and mobility management of wireless access devices in mobile communication network 100. A Session Management Function (SMF) is primarily responsible for interacting with the decoupled data plane, creating, updating and removing Protocol Data Unit (PDU) sessions and managing session context with the User Plane Function (UPF). The N3 Interworking Function (N3IWF) interfaces to 5G core network control plane functions, responsible for routing messages outside 5G RAN.

3GPP Radio access network RAN 102 may include base stations (gNBs or eNBs) providing radio access for UE 101 via various 3GPP radio access technologies (RATs) including 5G, 4G, and 3G/2G. Non-3GPP radio access network RAN 103 may include access points (APs) providing radio access for UE 101 via non-3GPP RAT including WiFi. UE 101 can obtain access to data network 120 through 3GPP access 102, AMF 110, SMF 111, and UPF 113. UE 101 can obtain access to data network 120 through non-3GPP access 103, N3IWF 112, AMF 110, SMF 111, and UPF 113. UE 101 may be equipped with a single radio frequency (RF) module or transceiver or multiple RF modules or transceivers for services via different RATs/CNs. UE 101 may be a smart phone, a wearable device, an Internet of Things (IoT) device, a tablet, etc.

In 5G/NR, a Protocol Data Unit (PDU) session defines the association between the UE and the data network that provides a PDU connectivity service. Each PDU session can be established via a 3GPP RAN, or via a non-3GPP RAN. Due to new radio conditions, load balancing, or due to specific service, different handover procedures can be used to handover a UE from a source NG-RAN node to a target NG-RAN node. Specifically, the handover procedures to hand over the PDU session from non-3GPP access to 3GPP access can be triggered by the network using a service request (SR) procedure, or triggered by the UE via a Mobile-originated (MO) PDU session establishment procedure. However, collision may occur between the SR procedure and the MO PDU session establishment procedure to hand over the same PDU session from non-3GPP access to 3GPP access.

In accordance with one novel aspect, a method for handling PDU session handover procedure collision in a next generation NG/5G system is proposed. In the example of FIG. 1, if Paging or Notification for PDU session handover comes before UE initiated MO PDU session establishment procedure for PDU session handover, then UE should avoid sending the PDU session establishment request for PDU session handover but only send the service request as a response to paging. Alternatively, The UE may ignore the paging or notification message and proceed with PDU session establishment procedure.

On the other hand, if Paging or Notification for PDU session handover comes after UE initiated MO PDU session establishment procedure for PDU session handover, then UE should avoid sending the service request for PDU session handover but proceed with the PDU session establishment procedure as a response to paging. Alternatively, UE may ignore the PDU session establishment procedure and send service request for PDU session handover as a response to paging.

Figure 2:
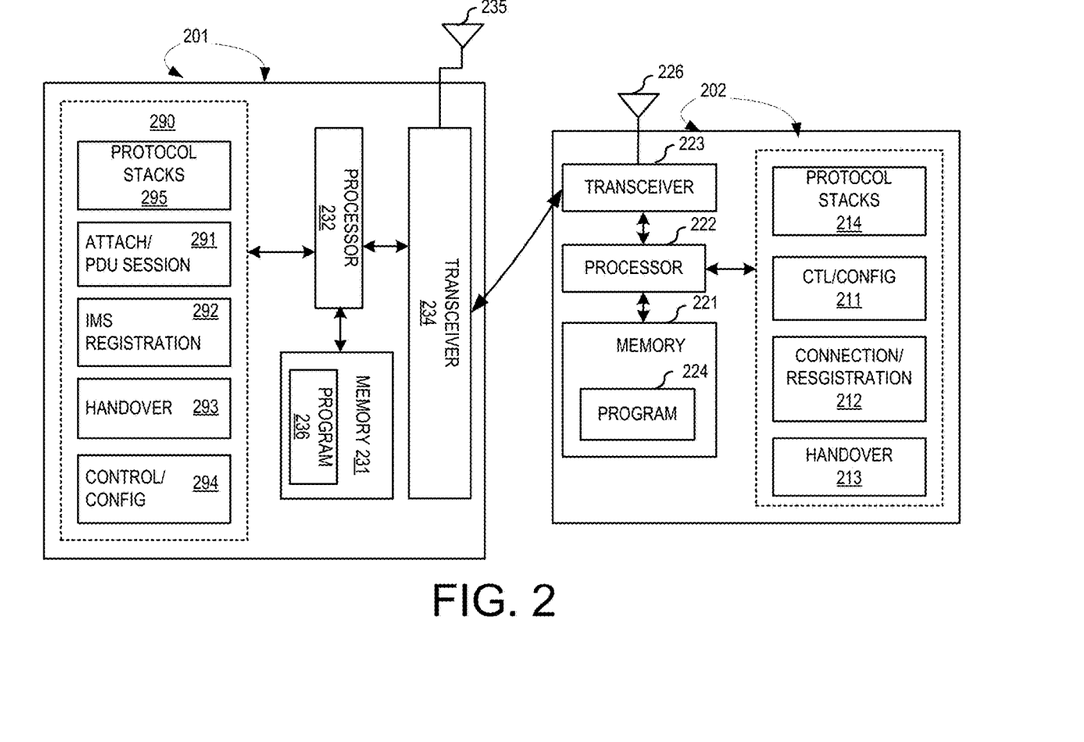
FIG. 2 illustrates simplified block diagrams of a user equipment (UE) and a base station (BS) in accordance with embodiments of the current invention.

FIG. 2 illustrates simplified block diagrams of a user equipment UE 201 and a base station BS 202 in accordance with embodiments of the current invention. BS 202 may have an antenna 226, which may transmit and receive radio signals. RF transceiver module 223, coupled with the antenna, may receive RF signals from antenna 226, convert them to baseband signals and send them to processor 222. RF transceiver 223 may also convert received baseband signals from processor 222, convert them to RF signals, and send out to antenna 226. Processor 222 may process the received baseband signals and invoke different functional modules to perform features in BS/AP 202. Memory 221 may store program instructions and data 224 to control the operations of BS 202. BS 202 may also include a set of functional modules and control circuits, such as a control and configuration circuit 211 for providing control and configuration parameters to UE, a connection and registration handling circuit 212 for establish PDU sessions and registration with UE, and a handover circuit 213 for sending handover commands to UE.

Similarly, UE 201 has an antenna 235, which may transmit and receive radio signals. RF transceiver module 234, coupled with the antenna, may receive RF signals from antenna 235, convert them to baseband signals and send them to processor 232. RF transceiver 234 may also convert received baseband signals from processor 232, convert them to RF signals, and send out to antenna 235. Processor 232 may process the received baseband signals and invoke different functional modules to perform features in the UE 201. Memory 231 may store program instructions and data 236 to control the operations of the UE 201. UE 201 may also include a set of function modules and control circuits 290 that may carry out functional tasks of the present invention. Protocol stacks 295 comprise Non-Access-Stratum (NAS) layer to communicate with an MME or an AMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. An attach and PDU session handing circuit 291 may attach to the network and establish PDU sessions with serving base station, an IMS registration circuit 292 may perform IMS registration with IMS server, a handover circuit 293 may trigger and handle PDU session handover procedure, and a control and configuration circuit 294 for detecting handover procedure collisions and deciding what to do when network initiated and UE initiated PDU session handover procedures collide.

The various function modules and control circuits may be implemented and configured by software, firmware, hardware, and combination thereof. The function modules and circuits, when executed by the processors via program instructions contained in the memory, interwork with each other to allow the base station and UE to perform embodiments and functional tasks and features in the network. Each module or circuit may comprise a processor (e.g., 222 or 232) together with corresponding program instructions. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201 and BS 202.

Figure 3:
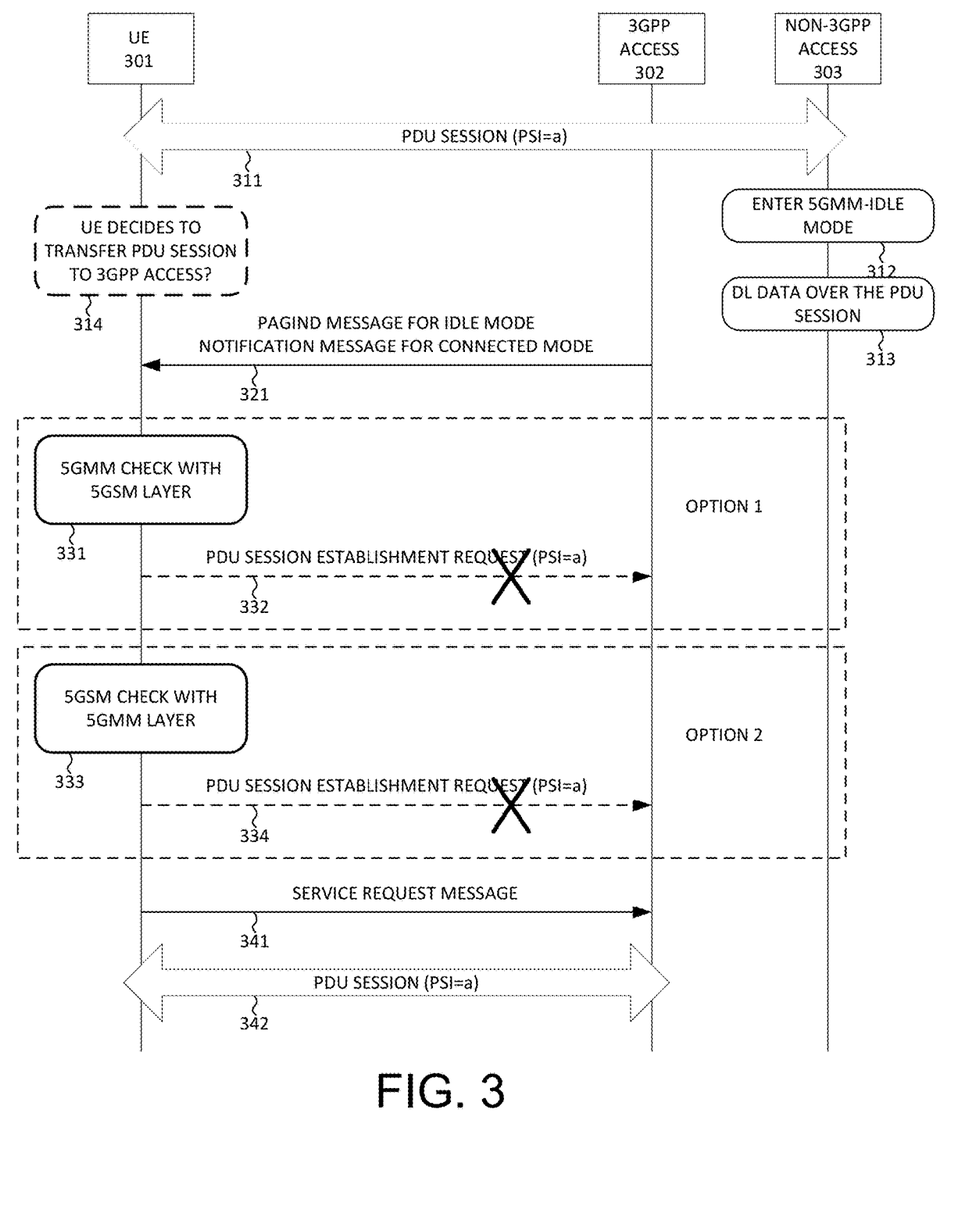
FIG. 3 illustrates a first embodiment of a method for handling PDU session handover procedure collision when paging comes before UE initiated MO PDU session establishment procedure in accordance with embodiments of the current invention.

FIG. 3 illustrates a first embodiment of a method for handling PDU session handover procedure collision when paging or notification for PDU session handover comes before UE initiated MO PDU session establishment procedure in accordance with embodiments of the current invention. In step 311, UE 301 establishes a PDU session with the core network over non-3GPP access network 303. For example, the non-3GPP access network is a WLAN served by a WiFi AP. The PDU session is identified by PSI=a. In step 312, UE 301 enters 5GMM-Idle mode over non-3GPP access, and enters 5GMM-Idle or 5GMM-Connected mode over 3GPP access. In step 313, UE 301 receives downlink (DL) data from the core network over the PDU session via the non-3GPP access. In step 321, UE 301 receives a paging message or a notification message. The paging and the notification messages are sent from the 3GPP access network 302 for UE 301 to handover the PDU session from non-3GPP access to 3GPP access, e.g., due to DL data pending over the PDU session which is currently established over the non-3GPP access, by using a service request (SR) procedure.

The SR procedure is used when the network has downlink data or downlink signaling pending over non-3GPP access, the UE is in 5GMM-Idle mode over non-3GPP access and in 5GMM-Idle or 5GMM-Connected mode over 3GPP access. For 5GMM-Idle mode over 3GPP access, the paging message is used to request re-establishment of user-plane resources of the PDU session(s) associated with non-3GPP access over 3GPP access. For 5GMM-CONNECTED mode over 3GPP access and 5GMM-IDLE mode over non-3GPP access, the notification message is used to request re-establishment of user-plane resources of the PDU session(s) associated with non-3GPP access over 3GPP access.

However, before UE 301 receives the paging or notification message, UE 301 has decided that a handover of the PDU session from non-3GPP access to 3GPP access (step 314) is needed, e.g., due to poor radio signal quality. The network is unaware of UE's decision of triggering another handover procedure to hand over the same PDU session from non-3GPP access to 3GPP access. As a result, a collision would occur between the network-triggered SR procedure and a (to-be) UE-triggered PDU session handover procedure. Since the paging or notification message of the SR procedure happens before the UE initiates the MO PDU session handover procedure, UE 301 should prevent the MO PDU session handover procedure being initiated.

Within the UE NAS layer, both 5GMM layer and 5GSM layer handle the PDU session handover procedure. In a first option, UE 5GSM layer controls the procedure. The 5GMM layer indicates/consults the 5GSM layer on the PDU session handover action (by using SR procedure) (step 331), therefore the 5GSM can avoid to send the PDU session establishment request to hand over the same PDU session(s) (step 332). In a second option, UE 5GMM controls the procedure. When the 5GSM layer tries to send the PDU session establishment request to handover the PDU session(s), the 5GSM layers checks with the 5GMM layer first to find out whether the same action has been on-going/done by the 5GMM layer (step 333). If the same action has been done/on-going, then the 5GSM layer will abort the PDU session establishment procedure to handover the PDU session(s) (step 334).

Since UE 301 avoids sending the PDU session establishment request (for PDU session handover), only the network-triggered PDU session handover procedure is pending. In step 341, UE 301 sends a service request message to 3GPP access in response to the paging or notification message of step 321. The service request message requests a handover for PDU session with PSI=a from non-3GPP to 3GPP access. In step 342, the PDU session with PSI=a is handed over from non-3GPP to 3GPP access.

Figure 4:
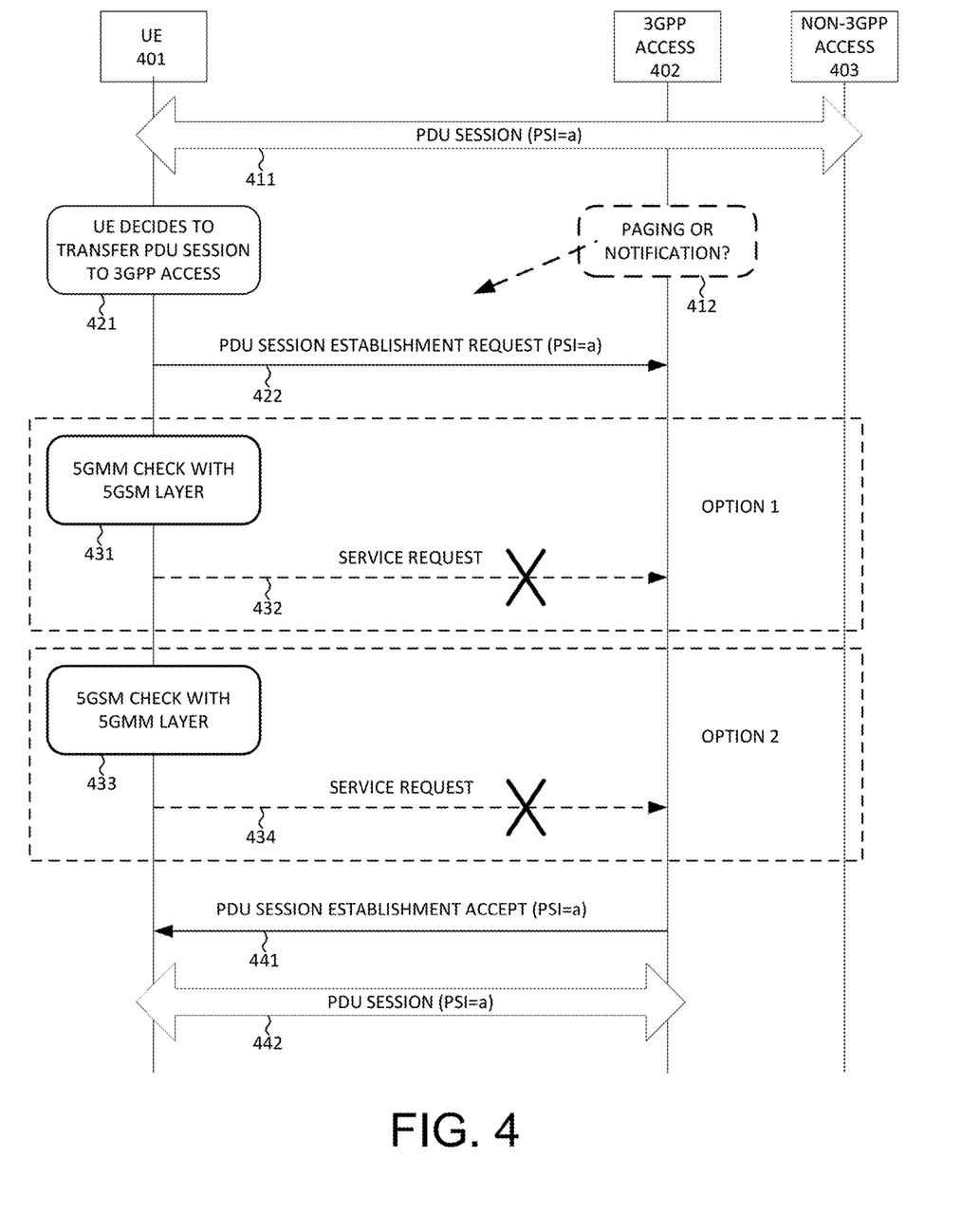
FIG. 4 illustrates a second embodiment of a method for handling PDU session handover procedure collision when paging comes after UE initiated MO PDU session establishment procedure in accordance with embodiments of the current invention.

FIG. 4 illustrates a second embodiment of a method for handling PDU session handover procedure collision when paging or notification for PDU session handover comes after UE initiated MO PDU session establishment procedure in accordance with embodiments of the current invention. In step 411, UE 401 establishes a PDU session with the core network over non-3GPP access network 403. For example, the non-3GPP access network is a WLAN served by a WiFi AP. The PDU session is identified by PSI=a. In step 421, UE 401 decides to handover the PDU session from non-3GPP access to 3GPP access, e.g., due to poor radio signal quality. The PDU handover procedure can be achieved via a PDU session establishment procedure with the core network over 3GPP access network 402. In step 422, UE 401 sends a PDU session establishment request message to the 3GPP access network 402. The request message is for the re-establishment of user-plane resources of the PDU session (with PSI=a) associated with non-3GPP access over 3GPP access.

However, before the network receives the PDU session establishment is completed, the network sends a paging message or a notification message to UE 401. The paging or the notification message is sent from the 3GPP access network 402 to UE 401 to handover the PDU session from non-3GPP access to 3GPP access, e.g., due to DL data pending over the PDU session which is currently established over the non-3GPP access, by using a service request (SR) procedure. UE 401 is unaware of the paging or notification message until after UE 401 already initiates the PDU session establishment procedure. As a result, a collision occurs between the network-triggered SR procedure and a UE-triggered PDU session handover procedure. Since the paging or notification message of the SR procedure happens after the UE initiates the MO PDU session handover procedure, UE 401 should ignore the paging or notification message and prevent the network-triggered session handover procedure being executed.

Within the UE NAS layer, both 5GMM layer and 5GSM layer handle the PDU session handover procedure. In a first option, UE 5GSM layer controls the procedure. The 5GMM layer indicates/consult 5GSM layer on the PDU session handover action (by using SR procedure) (step 431), if 5GSM has already the same action finished/on-going, the 5GMM can avoid to send the SR message to handover the PDU session (step 432). In a second option, UE 5GMM controls the procedure. When the 5GSM layer try to send the PDU session establishment procedure to handover the PDU session(s), it sends to 5GMM layer first to check whether the same action has been on-going/done by 5GMM layer (step 433). In this case, since there no action has been done/ongoing in 5GMM layer, so the PDU session establishment procedure can be initiated, and the following 5GMM SR procedure should be forbidden (step 434).

Since UE 401 avoids sending the service request (for PDU session handover), only the UE-triggered PDU session handover procedure is pending. In step 441, UE 401 receives a PDU session establishment accept message from 3GPP access network 402. In step 442, the PDU session with PSI=a is handed over from non-3GPP to 3GPP access. Alternatively, UE shall abort the PDU session establishment procedure and send service request for PDU session handover (as a response to paging). This is because sometimes network/operator gives higher priority to NW-initiated procedure upon collisions.

Figure 5:
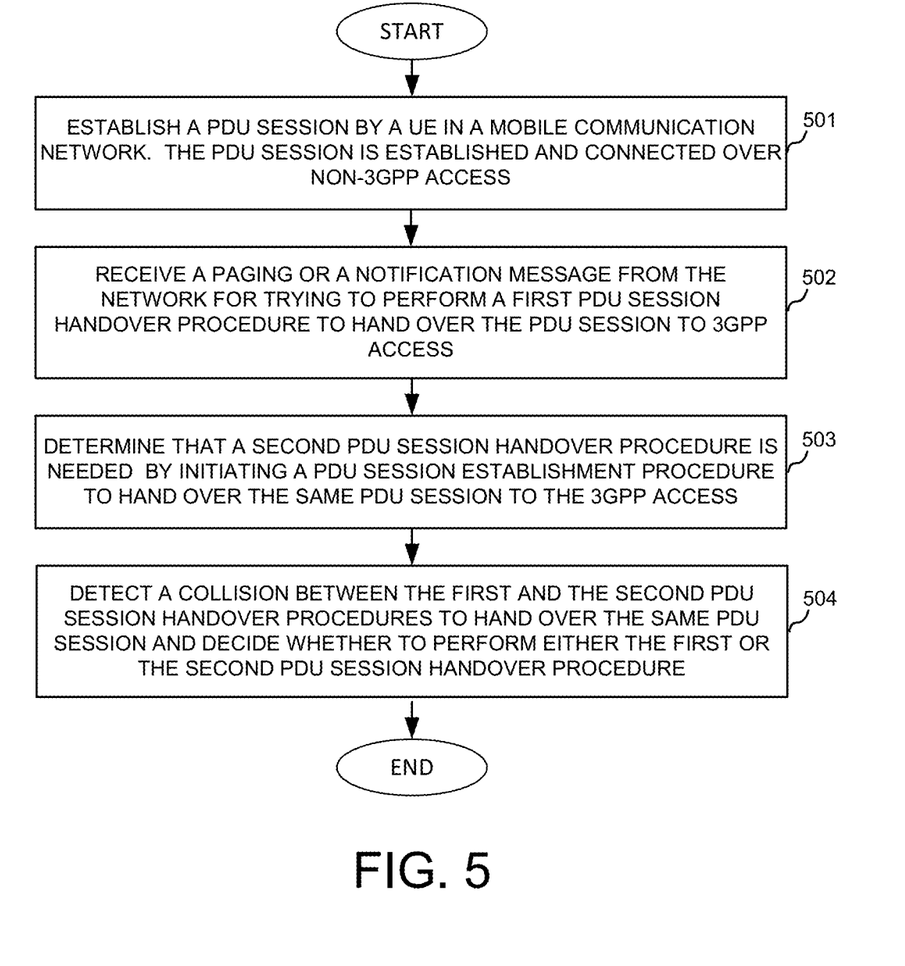
FIG. 5 is a flow chart of a method of handling PDU session handover procedure collision in accordance with a novel aspect.

FIG. 5 is a flow chart of a method of handling PDU session handover procedure collision in accordance with a novel aspect. In step 501, a UE establishes a protocol data unit (PDU) session in mobile communication network. The PDU session is established and connected over a non-3GPP access. In step 502, the UE receives a paging or notification message from the network for trying to perform a first PDU session handover procedure to hand over the PDU session to a 3GPP access. In step 503, the UE determines that a second PDU session handover procedure is needed by the UE initiating a PDU session establishment procedure to hand over the same PDU session to the 3GPP access. In step 504, the UE detects a collision between the first and the second PDU session handover procedures to hand over the same PDU session and decides whether to perform either the first or the second PDU session handover procedure.

In one embodiment, the paging or notification message is received before the UE initiates the PDU session establishment procedure. The UE continues with the first PDU session handover procedure by sending a service request in response to the paging or the notification message to complete the PDU session handover. As a result, the UE does not perform the second PDU session handover procedure. In another embodiment, the paging or notification message is received after the UE initiates the PDU session establishment procedure. The UE continues with the second PDU session handover procedure by sending a PDU session establishment request message to the network over the 3GPP access. The UE does not perform the first PDU session handover procedure. Alternatively, UE shall abort the PDU session establishment procedure and send service request for PDU session handover (as a response to paging). A 5G session management (5GSM) layer or 5G mobility management (5GMM) layer of the UE decides whether to perform either the first PDU session handover or the second PDU session handover procedure.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
establishing a protocol data unit (PDU) session by a user equipment (UE) in mobile communication network, wherein the PDU session is established and connected over non-3GPP access, wherein the PDU session is identified by a PDU session ID (PSI);
receiving a paging or notification message from the network for trying to perform a first PDU session handover procedure to hand over the PDU session to 3GPP access, wherein the first PDU session handover procedure is initiated by the network by sending a SERVICE REQUEST message indicating the PDU session identified by the PSI;
determining a second PDU session handover procedure is needed by initiating a PDU session establishment procedure to hand over the same PDU session to the 3GPP access, wherein the second PDU session handover procedure is initiated by the UE by sending a PDU SESSION ESTABLISHMENT REQUEST message indicating the PDU session identified by the same PSI; and
detecting a collision between the first and the second PDU session handover procedures to hand over the same PDU session having the same PSI, wherein the UE continues with the first PDU session handover procedure by sending a service request message in response to the paging or the notification message from the network, and wherein the UE aborts the second PDU session handover procedure initiated by the UE.

2. The method of claim 1, wherein the paging or notification message is received before the UE initiates the PDU session establishment procedure.

3. The method of claim 2, wherein the UE avoids sending the PDU session establishment request message to the network.

4. The method of claim 1, wherein the paging or notification message is received after the UE initiates the PDU session establishment procedure.

5. The method of claim 1, wherein the UE receives the paging message when the UE is in idle mode, wherein the UE receives the notification message when the UE is in connected mode.

6. The method of claim 1, wherein a 5G session management (5GSM) layer or a 5G mobility management (5GMM) layer of the UE decides whether to perform the first or the second PDU session handover procedure.

7. A User Equipment (UE), comprising:
a protocol data unit (PDU) handling circuit that establishes a PDU session in mobile communication network, wherein the PDU session is established and connected over non-3GPP access, wherein the PDU session is identified by a PDU session ID (PSI);
a receiver that receives a paging or notification message from the network for trying to perform a first PDU session handover procedure to hand over the PDU session to 3GPP access, wherein the first PDU session handover procedure is initiated by the network by sending a SERVICE REQUEST message indicating the PDU session identified by the PSI;
a handover circuit that determines a second PDU session handover procedure is needed by the UE initiating a PDU session establishment procedure to hand over the same PDU session to the 3GPP access, wherein the second PDU session handover procedure is initiated by the UE by sending a PDU SESSION ESTABLISH- MENT REQUEST message indicating the PDU session identified by the same PSI; and a control circuit that detects a collision between the first and the second PDU session handover procedures to hand over the same PDU session having the same PSI and decides whether to perform either the first or the second PDU session handover procedure, wherein either the UE continues with the first PDU session handover procedure by sending a service request message in response to the paging or the notification message from the network, and wherein the UE aborts the second PDU session handover procedure initiated by the UE.

8. The UE of claim 7, wherein the paging or notification message is received before the UE initiates the PDU session establishment procedure.

9. The UE of claim 8, wherein the UE avoids sending a PDU session establishment request message to the network.

10. The UE of claim 7, wherein the paging or notification message is received after the UE initiates the PDU session establishment procedure.

11. The UE of claim 10, wherein the UE avoids sending a service request in response to the paging or the notification message.

12. The UE of claim 10, wherein the UE proceeds with the first PDU session handover procedure by sending a service request in response to the paging or the notification message and aborts the second PDU session handover procedure.

13. The UE of claim 7, wherein the UE receives the paging message when the UE is in idle mode, wherein the UE receives the notification message when the UE is in connected mode.

14. The UE of claim 7, wherein a 5G session management (5GSM) layer or a 5G mobility management (5GMM) layer of the UE decides whether to perform the first or the second PDU session handover procedure.

* * * * *